United States Patent
Gulati et al.

(10) Patent No.: US 12,270,931 B2
(45) Date of Patent: Apr. 8, 2025

(54) METHODS AND SYSTEM FOR PREDICTIVE COORDINATION OF EGO AND INTERFERER RADAR PARAMETERS

(71) Applicant: QUALCOMM Incorporated, San Diego, CA (US)

(72) Inventors: Kapil Gulati, Belle Mead, NJ (US); Ahmed Bedewy, Hillsborough, NJ (US); Dan Zhang, San Diego, CA (US); Junyi Li, Fairless Hills, PA (US)

(73) Assignee: QUALCOMM Incorporated, San Diego, CA (US)

( * ) Notice: Subject to any disclaimer, the term of this patent is extended or adjusted under 35 U.S.C. 154(b) by 731 days.

(21) Appl. No.: 17/450,854

(22) Filed: Oct. 14, 2021

(65) Prior Publication Data

US 2022/0120845 A1 Apr. 21, 2022

Related U.S. Application Data

(60) Provisional application No. 63/092,369, filed on Oct. 15, 2020.

(51) Int. Cl.
| | |
|---|---|
| G01S 7/02 | (2006.01) |
| G01S 7/41 | (2006.01) |
| G01S 13/58 | (2006.01) |
| H04W 4/40 | (2018.01) |

(52) U.S. Cl.
CPC ............ *G01S 7/0232* (2021.05); *G01S 7/415* (2013.01); *G01S 13/58* (2013.01); *H04W 4/40* (2018.02)

(58) Field of Classification Search
CPC ...... G01S 13/878; G01S 7/0232; G01S 7/415; G01S 13/58
USPC ................................ 342/128, 125, 109, 149
See application file for complete search history.

(56) References Cited

U.S. PATENT DOCUMENTS

| | | | |
|---|---|---|---|
| 9,857,460 B2 * | 1/2018 | Yokoyama | G01S 13/95 |
| 10,803,741 B2 * | 10/2020 | Ramler | G07C 5/0891 |
| 2013/0201050 A1 * | 8/2013 | Hellsten | G01S 7/03 342/21 |
| 2022/0091227 A1 * | 3/2022 | Zhang | G01S 13/878 |

* cited by examiner

*Primary Examiner* — Bo Fan
(74) *Attorney, Agent, or Firm* — Haynes and Boone, LLP

(57) ABSTRACT

Systems and methods for predictive coordination of ego radar and interferer radar parameters are disclosed. In some aspects, a processor associated with a first radar system transmitting a first radar waveform to detect a target may identify a presence of a second radar system transmitting a second radar waveform in a vicinity of the first radar system. The processor may further predict an upcoming interference by the second radar waveform of the detection of the target by the first radar system. In addition, the processor may, in response to the predicting the upcoming interference, determine an adjustment to a first parameter of the first radar waveform and/or to a second parameter of the second radar waveform.

30 Claims, 9 Drawing Sheets

METHODS AND SYSTEM FOR PREDICTIVE COORDINATION OF EGO AND INTERFERER RADAR PARAMETERS

CROSS-REFERENCE TO RELATED APPLICATIONS

The present application claims priority to and the benefit of the U.S. Provisional Patent Application No. 63/092,369, filed Oct. 15, 2020, titled "Methods and System for Predictive Coordination of Ego and Interferer Radar Parameters," which is hereby incorporated by reference in its entirety as if fully set forth below and for all applicable purposes.

INTRODUCTION

Modern motor vehicles are increasingly incorporating technology that helps drivers avoid drifting into adjacent lanes or making unsafe lane changes (e.g., lane departure warning (LDW)), or that warns drivers of other vehicles behind them when they are backing up, or that brakes automatically if a vehicle ahead of them stops or slows suddenly (e.g., forward collision warning (FCW)), among other things. The continuing evolution of automotive technology aims to deliver even greater safety benefits, and ultimately deliver automated driving systems (ADS) that can handle the entire task of driving without the need for user intervention. Such technology, in most cases, includes radar detection of other vehicles, pedestrians, objects, etc. that are in the vicinity of the vehicle equipped with the technology.

BRIEF SUMMARY OF SOME EXAMPLES

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

Some aspects of the present disclosure disclose a method detecting, via a processor associated with a first radar system transmitting a first radar waveform to detect a target, a presence of a second radar system transmitting a second radar waveform in a vicinity of the first radar system. The method further comprises determining, via the processor and in response to an upcoming interference by the second radar waveform of the detection of the target by the first radar system, an adjustment to a first parameter of the first radar waveform and/or to a second parameter of the second radar waveform.

Some aspects of the present disclosure disclose an apparatus comprising a processor configured to detect a presence of a second radar system transmitting a second radar waveform in a vicinity of a first radar system transmitting a first radar waveform to detect a target. In some aspects, the process is further configured to determine, in response to an upcoming interference by the second radar waveform of the detection of the target by the first radar system, an adjustment to a first parameter of the first radar waveform and/or to a second parameter of the second radar waveform.

Some aspects of the present disclosure disclose a non-transitory computer-readable medium having program code recorded thereon. In some aspects, the program code can include code for causing a processor, associated with a first radar system transmitting a first radar waveform to detect a target, to detect a presence of a second radar system transmitting a second radar waveform in a vicinity of the first radar system. Further, the program code can include code for causing the processor to determine, in response to an upcoming interference by the second radar waveform of the detection of the target by the first radar system, an adjustment to a first parameter of the first radar waveform and/or to a second parameter of the second radar waveform.

Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

BRIEF DESCRIPTION OF THE DRAWINGS

The accompanying drawings are presented to aid in the description of various aspects of the disclosure and are provided solely for illustration of the aspects and not limitation thereof.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

In some aspects, an ego radar source may use a radar system to track and/or detect a target in the presence of one or more other radar sources. The presence of the other radar sources, however, may interfere with the detection and/or tracking of targets by the ego radar source, because the interference may make it difficult for the ego radar to distinguish radar signals from various radar sources. For example, the interference may give rise to the detection of so-called ghost targets where the real sources of signals appear shifted in position (e.g., closer) to the ego radar and the signals with higher power. In some cases, such difficulty may be due to the fact that a beat frequency, calculated based at least in part on a difference between instantaneous frequencies of the transmitted signal and a received interference signal, may be indistinguishable from a beat frequency associated with a reflective target. In some cases, the interference may cause a radar source to trigger unnecessary actions based on false detection of a target, fail to trigger actions that should be triggered in the presence of a target based on a failure to detect a target due to the presence of interference, transmit additional radar chirps in an attempt to distinguish a target, thereby increasing processing and communication resource consumption, and/or the like.

Figure 1:
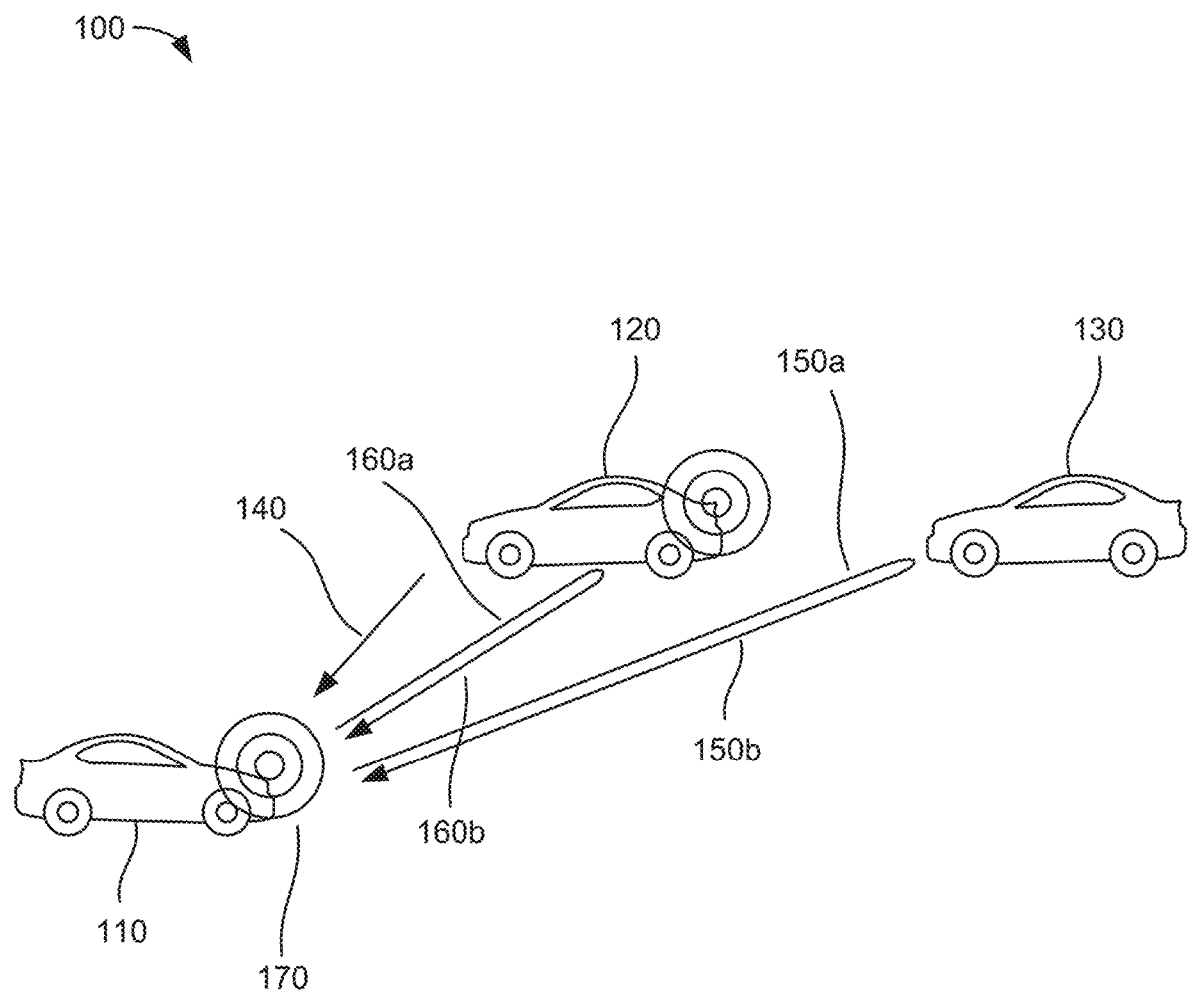
FIG. 1 shows an example illustration of multiple interfering radar signals, according to some aspects of the disclosure.

FIG. 1 shows an example illustration of multiple interfering radar signals, according to some aspects of the disclosure. In some aspects, multiple radar sources such as a first radar source 110 (e.g., vehicle 110 having a first radar system) and a second radar source 120 (e.g., another vehicle having a second radar system) may be transmitting signals when the radar sources 110, 120 are in the vicinity of each other and/or a target 130 is in the vicinity of the radar sources 110, 120. In some aspects, the term "vicinity" about a radar source may be understood to refer to the area surrounding the radar source where the signals emitted by the radar source, or intensities thereof, have not decayed by more than a threshold amount (e.g., by more than about 90%, about 95%, about 99%, including values and subranges therebetween, of the signals emitted by the radar source). In some aspects, the term "vicinity" about a target may be understood to refer to the area surrounding a first target that receives radar signals emitted by a radar source where a second target in the area may receive the same signals with substantially similar intensity (e.g., at least about 50%, at least about 65%, at least about 75%, including values and subranges therebetween) as the signals that arrived at the first target. In some aspects, the term "vicinity" may have its customary and plain meaning. It should be clear from the context in which the term "vicinity" is used which meaning of the term applies.

In some aspects, the first radar source 110 (alternatively referred as "ego radar" source) may be tracking or detecting the target 130, which may be in the vicinity of a second radar source 120, and the ego radar source 110 may use its radar system to emit a radar signal to detect the target 130. In some cases, the signals emitted by the ego radar source 110 to detect and/or track the target 130 include signals 150a emitted in the direction of the target 130 and signals 160a emitted in the direction of the second signal source 120. In some cases, the signals 150a emitted to the target may be reflected back to the ego radar source 110 as target reflection signals 150b and the signals 160a emitted in the direction of the second radar source 120 may be reflected back as second radar source reflection signals 160b. In some aspects, the second radar source 120 may also emit its own signals, for example using its radar system, and these second radar source signals 140 may be directed to and arrive at the ego radar source 110.

Figure 2:
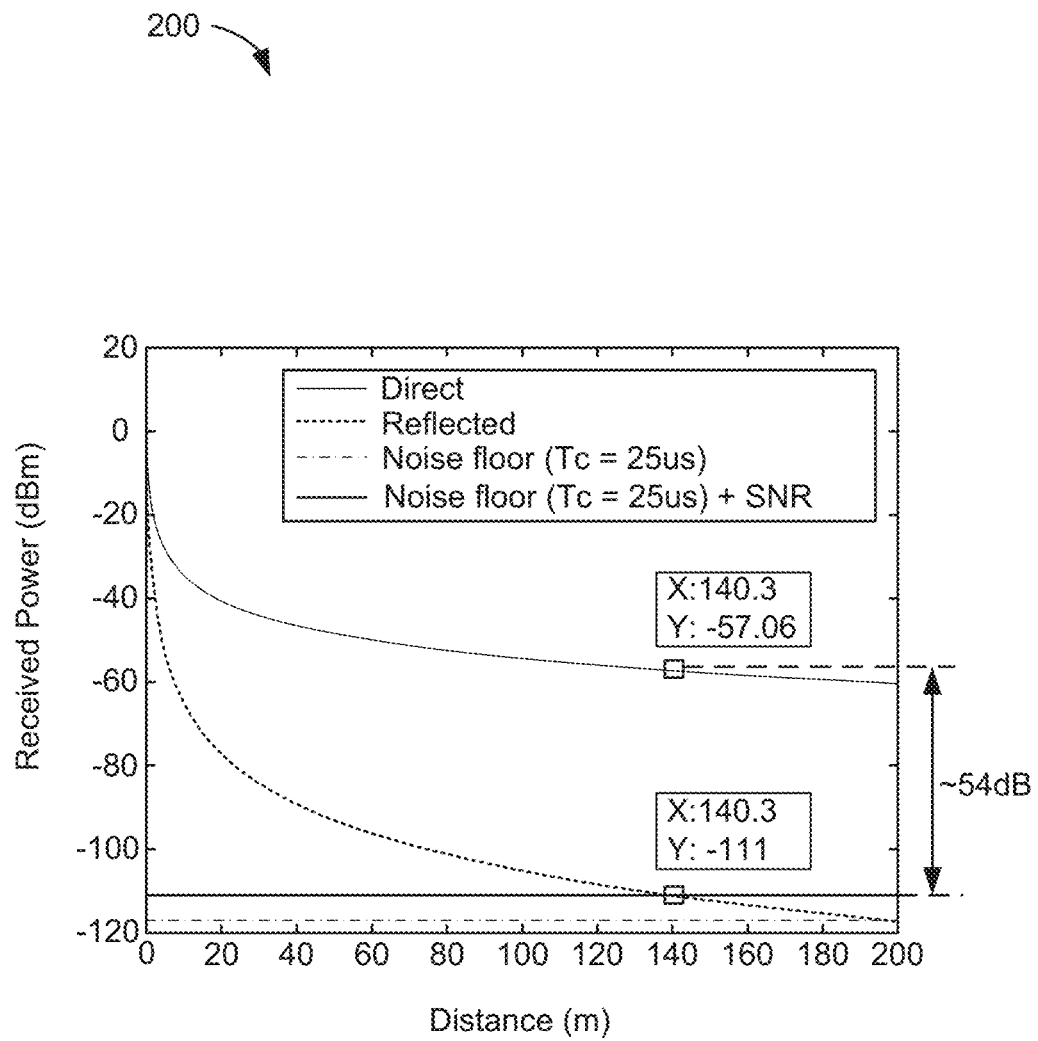
FIG. 2 shows an example illustration of the effects of an interfering radar source on target detection by an ego radar source, according to some aspects of the disclosure.

In some aspects, the presence of the second radar source 120 (alternatively referred as "interferer") in the vicinity of the ego radar source 110 may interfere with or impact the detection or tracking of the target 130 by the ego radar source 110. Because radar waveforms (e.g., such as some conventional ones currently in use) can be indistinguishable when coming from different sources, the interference from the interferer 120 may cause the ego radar source 110 to erroneously detect a "ghost" target located at about half the distance to the interferer 120 reflecting signals. For instance, the ego radar source 110 may erroneously determine that a ghost vehicle is present at about half the distance to the interferer 120, because the ego radar source 110 may interpret the radar signal received from the interferer 120 as having traveled from the ego radar source 110 to the ghost target and back in the time it actually took the received signal (e.g., 140) to travel from the interferer 120 to the ego radar source 110 (e.g., including time offset due to reflection as opposed to taking a direct path). Further, the ghost target may appear as having higher power (i.e., the interference may be high), because the power of signals from a direct path, such as the power of interferer signals 140 received at ego-radar 110 is inversely proportional to the square of the distance R ($R^2$) from the signal source (e.g., interferer 120) to the ego-radar 110, while the power of reflected signals, such as the power of interferer reflection signals 160b received at ego-radar 110 is inversely proportional to the fourth power of the distance R ($R^4$). This is illustrated in FIG. 2 where the power of interferer reflection signals 160b (i.e., labeled "reflected") received at the ego radar source decays much faster than the power of the direct radar signal from the interferer 120 (i.e., labeled "direct"). In some aspects, to prevent such a misdetection, the ego radar source 110 can increase the noise floor (a signal strength threshold under which an ego radar source may ignore reflections) to eliminate the detection of ghost targets. However, also as illustrated in FIG. 2, this can potentially prevent the detection of real targets.

FIG. 2 shows an example illustration of the effects of an interfering radar source on target detection by an ego radar source, according to some aspects of the disclosure. For example, with reference to FIG. 2, if the interferer 120 is 140.3 meters from the ego radar source 110, the received power of the radar signal 140 received directly from the interferer 120 may be −57.06 decibel-milliwatts (dBm), while the received power of the reflected radar signal (i.e., interferer reflection signals 160b) may be −111 dBm. If the ego radar source 110 increases the noise floor (illustrated as $T_c$=25 µs or $T_c$=25 µs plus the sound to noise ratio (SNR))

to eliminate the detection of the radar signal following the direct path, it can also eliminate the detection of the radar signal following the reflected path, in particular signals coming from longer distances.

Figure 3A:
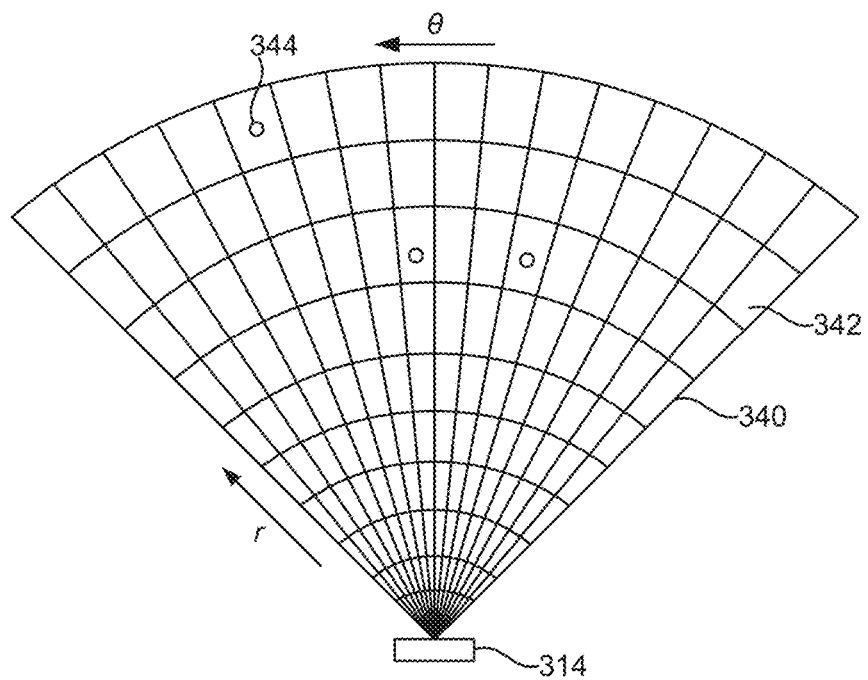
FIG. 3A illustrates a sensed observation radar grid, according to some aspects of the disclosure.

FIG. 3A illustrates a sensed observation radar grid, according to some aspects of the disclosure. A transmitter (e.g., an array of transmit antennas) of the radar source 314 transmits pulses of electromagnetic RF waves that reflect from object(s) in the transmission path, such as interferer 120 and target 130 in FIG. 1. A portion of the electromagnetic RF waves that are reflected from the object(s) are returned to the receiver (e.g., an array of receive antennas) of the radar source 314, which is usually located at the same site as the transmitter of the radar source 314.

In an aspect, the radar source 314 may be an imaging radar that uses beamforming to scan horizontally and vertically. Beamforming is a technique used to aim the effective direction of a radar beam by changing the delay between different transmitting antennas so that the signals add constructively in a specified direction. Thus, the radar source 314 may scan horizontally and vertically across the sensing area by using a transmitter comprising an array of electronically steered antennas.

The returned responses (which may also be referred to as "pings") measured by the radar source 314 can be characterized as an observation (or occupancy) grid 440 having a plurality of observation cells 342. Each cell 342 represents the measured returned response value at a specific range (r) and angle/azimuth (θ). Each cell 342 is alternately referred to as a range-angle bin. Features 344 are extracted from the cells 342 to determine whether the feature 344 is an object (e.g., a vehicle 120/130). Each feature 344 within a respective cell 342 can be identified as having up to four parameters: range, Doppler, azimuth, and elevation. This is called a radar frame. As an example, a feature 344 within a cell 342 may be the signal-to-noise ratio (SNR) computed by a constant false alarm rate (CFAR) algorithm. However, it should be understood that other methods may be used to target and identify features 344 within a cell 342.

The processor(s) (e.g., 706) may generate two-dimensional (2D), three-dimensional (3D), or four dimensional (4D) tensors for features 344 within cells 342 of the observation grid 340 detected by the radar 314. Specifically, a 2D tensor represents the range (i.e., distance from the radar source (e.g., 110) to the detected feature 344) and azimuth (the horizontal distance between a feature 344 and a reference RF ray emitted by the radar 314, such as the initial RF ray of a radar sweep) of each detected feature 344. A 3D tensor represents the range, azimuth, and Doppler (indicating the speed of the detected feature 344) or elevation (vertical direction from the radar 314 to the detected feature) of each detected feature 344. A 4D tensor represents all four quantities. The processor(s) 706 then performs object detection, object classification, localization, and property/attribute estimation based on the tensors and, in some cases, undistorted camera frames received from the camera 712.

Frequency-modulated continuous-wave (FMCW) radar is a type of conventional radar that suffers from the above drawbacks. FMCW radar is a short-range measuring radar capable of providing distance measurements to a target object along with speed measurements of the target object. FMCW uses a transmitted signal of a known stable frequency continuous wave that varies in frequency over a fixed period of time by a modulating signal. The frequency difference between the received (reflected) signal and the transmitted signal increases with delay, and hence with distance. This smears out, or blurs, the Doppler signal. Echoes from a target object are then mixed with the transmitted signal to produce a beat signal, which provides the distance to the target object after demodulation.

Figure 3B:
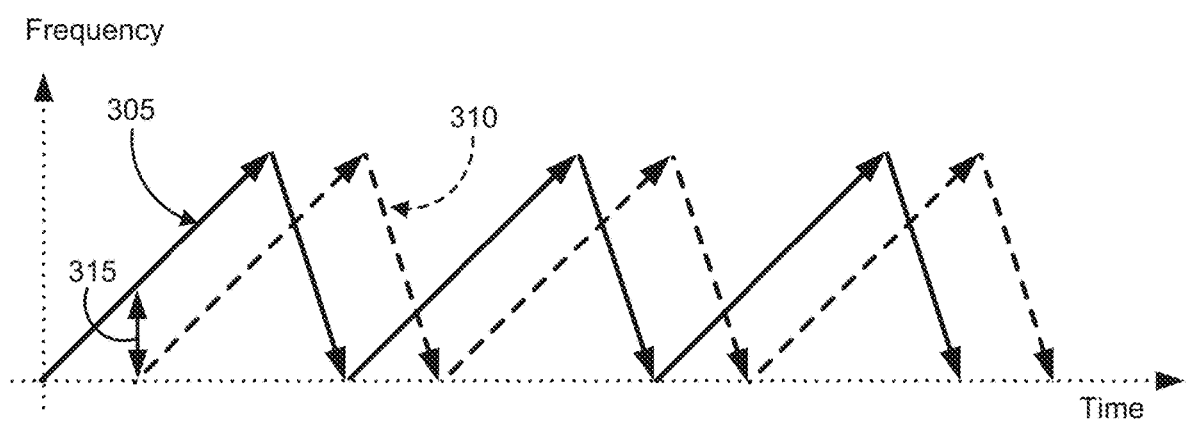
FIG. 3B shows an example illustration of frequency modulated continuous wave (FMCW) radar signal, according to some aspects of the disclosure.

FIG. 3B shows an example illustration of frequency modulated continuous wave (FMCW) radar signal, according to some aspects of the disclosure. In some aspects, the radar signals emitted by radar sources such as the ego radar source 110, the interferer 120, etc., may be FMCW signals, illustrated in FIG. 3 by a plot showing repeated FMCW chirps 305 in terms of frequency over time and of a received signal 310. In some aspects, a single instance (e.g., cycle) of the FMCW chirp 305 may be represented by a pair of arrows—a rising arrow representing an increase from a first frequency value to a second frequency value (e.g., a frequency sweep), and an immediately subsequent falling arrow, indicating a decrease from the second frequency value to the first frequency value. Similarly, a single instance of the received signal 310 may be represented by a pair of arrows—a rising arrow representing an increase from a first frequency value to a second frequency value and an immediately subsequent falling arrow, indicating a decrease from the second frequency value to the first frequency value.

In some aspects, FMCW radar uses a linear frequency modulated signal to obtain range. The received signal is mixed with the transmitted signal to obtain the beat frequency 315 between the two. The beat frequency may be a difference between an instantaneous frequency of the FMCW chirp 305 and a corresponding instantaneous frequency of the received signal 310. The beat frequency may be a function of the round-trip time to the reflecting target, and therefore can be mapped directly to the target's range. Beamforming associated with multiple receiver channels may be used to determine direction of arrival (DoA) of a received signal, which may correlate to a target's azimuthal location and/or elevation, if applicable. Multiple radar signal chirps may be transmitted in a train of equally spaced pulses in time. Radial motion occurring between pulses within a range of resolution cell induces a shift over the pulses, which may be used to compute the Doppler radial velocity in that cell. Received radar data may be expressed as a three-dimensional (3D) tensor, with the first two dimensions (range and DoA) making up polar space, and the third dimension (Doppler radial velocity) containing velocity information.

Figure 4A:
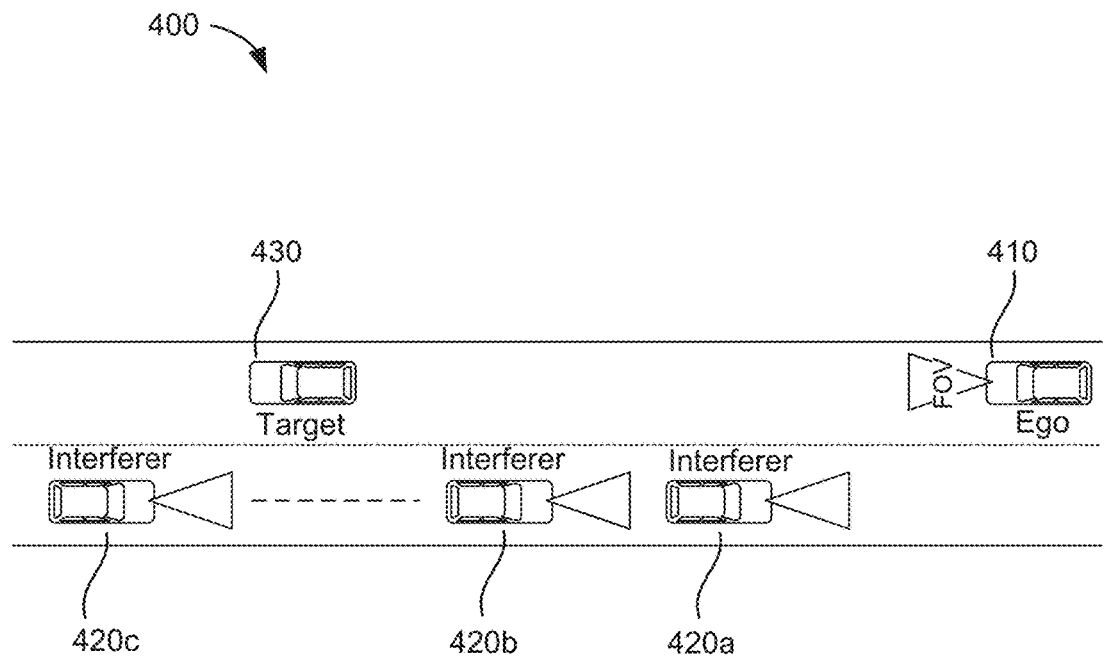
FIG. 4A-B show schematic illustrations of target detection and ego-radar processing in the presence of multiple interfering radar sources, according to some aspects of the disclosure.
Figure 4B:
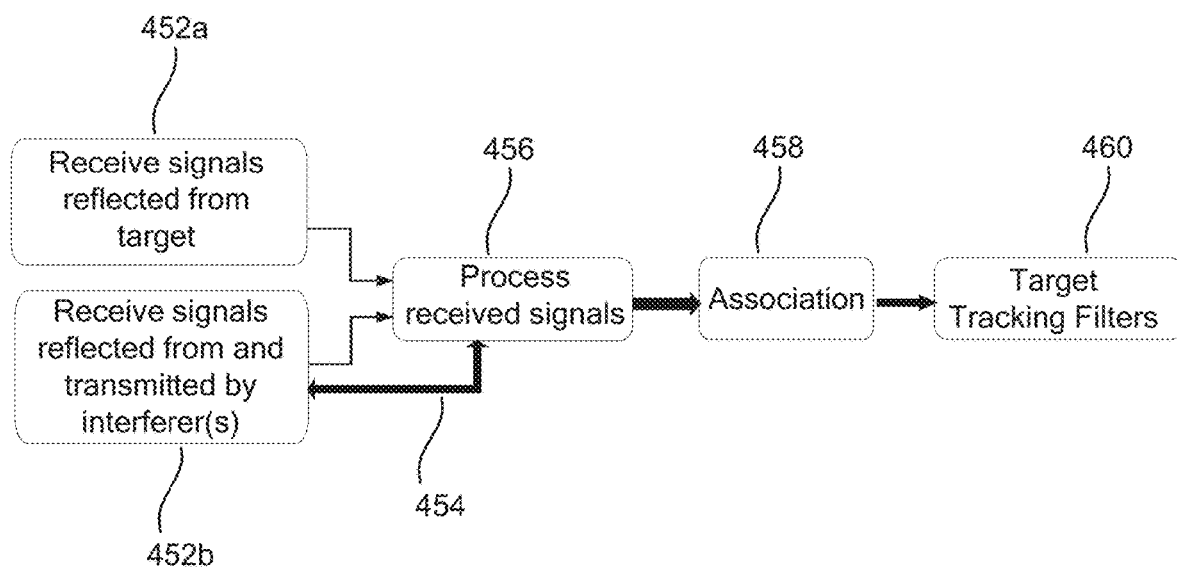

FIGS. 4A-B show schematic illustrations of target detection and ego-radar processing in the presence of multiple interfering radar sources, according to some aspects of the disclosure. With respect to FIG. 4A, in some aspects, an ego radar source 410 including a radar system may be detecting and/or tracking a target 430 in the presence of interferers 420a-c, each of which may have its own respective radar system. The ego radar source 410 may emit or transmit, using its radar system, a radar signal and receive reflections, which may include reflections from the target 430 and/or one or more of the interferers 420a-c in the vicinity of the ego radar source 410 and/or the target 430. In some cases, the ego radar source 410 may also receive direct radar signals transmitted from the interferers 420a-c. That is, with respect to FIG. 4B, for example, at 452a, after transmitting a radar signal towards the target 430 (and in some cases, towards the interferers 420a-c), the ego radar source 410 may receive signals reflected from the target 430. Further, at 452b, the ego radar source 410 may also receive signals reflected from the interferers 420a-c (e.g., reflections of signals transmitted by the ego radar source 410) as well as signals transmitted by the interferers 420a-c towards the ego radar source 410.

In some aspects, at 456, the ego radar source 410 may process the received signals. For example, at 458, the ego radar source 410 may generate radar images based on the received signals and perform associations between the radar image detections and the target 430 being tracked and/or the interferers 420*a-c*. That is, in some cases, the ego radar source 410 may identify or detect on the radar images the target 430 and/or the interferers 420*a-c*. For instance, at 460, the ego radar source 410 may filter the radar images and identify or detect which features on the radar images correspond to the target 430 and/or the interferes 420*a-c*. In some cases, because of the interference from the reflected and/or transmitted signals received from the interferers 420*a-c* with the signals reflected from the target 430, the ego radar source may fail to at least accurately detect or track the target 430. For instance, the ego radar source 410 may mis-detect the target 430 by, for example, falsely identifying features that do not correspond to the target 430 as the target 430 (i.e., "false alarms"). In some cases, ego radar source 410 may also inaccurately identify features on the radar images as new target that in fact are not present in the scene (e.g., "ghost targets"). In some aspects, the term "interference" may be broadly understood as the mis-detection or mis-tracking of a target by an ego radar source due to signals transmitted or reflected by interferers that are in the vicinity of the target and/or the ego radar source.

In some aspects, the ego radar source 410 may coordinate with the interferers 420*a-c* in the vicinity of the ego radar source 410 and/or the target 430 to at least reduce or eliminate the interference of the interferers 420*a-c* with the detection and/or tracking of the target 430. For example, the ego radar source 410 may communicate with the interferers 420*a-c* to reduce or eliminate the interference of the reflected and/or transmitted signals received from the interferers 420*a-c* with the signals reflected from the target 430, the latter of which can then be used to detect and/or track the target 430. In some aspects, the ego radar source 410 may communicate with the interferers 420*a-c* via a side-communication or sidelink channel such as but not limited to vehicle-to-everything (V2X) communication channel. In some aspects, the V2X communication channel may be using radio access technology (RAT) such as but not limited to 4G Long Term Evolution (LTE) RAT and/or 5G New Radio (NR) RAT.

In some aspects, the ego radar source 410 may coordinate with the interferers 420*a-c* to at least reduce or eliminate the interference by communicating requests to the interferers 420*a-c* to alter one or more radar parameters of their respective radar signals. In some aspects, the ego radar source 410 may have determined the changes to the radar parameters of the interferers 420*a-c* that the interferers 420*a-c* may have to make to at least reduce or eliminate the interference (e.g., interference due to signals transmitted by the interferers 420*a-c*) and may provide the determined radar parameter changes to the interferers 420*a-c* with the request to change the radar parameters. In some aspects, the ego radar source 410 may indicate the presence of the interference to the interferers 420*a-c* and the interferers 420*a-c* may determine the radar parameter changes to at least reduce or eliminate the interference. For instance, the changes can be pre-determined or pre-set or the interferers 420*a-c* may make the determinations dynamically when the presence of the interference is indicated by the ego radar source 410.

In some aspects, the afore-mentioned radar parameters may include one or more of waveform types, frequency (e.g., starting and/or stopping frequencies), bandwidth, spectrum, slope or ramp of the frequency, time of transmission, chirps, etc., of the radar signals. In some cases, as noted above, the ego radar source may determine changes that an interferer 420*a-c* may have to make to one or more of these radar parameters of that interferer's radar signals to at least reduce or eliminate the interference that causes mis-detection and/or mis-tracking of the target 430. For example, the ego radar source 410 may determine that an interferer 420*a-c* may have to decrease or increase its frequency, change the time of the radar signals transmission or the waveform of the radar signals, etc., and inform the interferer 420*a-c* of these changes so that the interferer 420*a-c* could perform the corresponding radar parameter changes. In some cases, the ego radar source 410 may indicate the presence of the interference to the interferer 420*a-c* and the interferer 420*a-c* may make the determination about, and enact, the radar parameter changes.

In some aspects, the ego radar source 410 may determine radar parameter changes that it can make to the radar signals that the ego radar source 410 emits towards the target 430 (e.g., to detect and/or track the target 430) and/or the interferers 420*a-c*. For example, the ego radar source may alter or make changes to one or more of the afore-mentioned radar parameters of the radar signals that the ego radar source 410 emits so as to at least reduce or eliminate the interference (e.g., signals reflected from the interferers 420*a-c* after the emission or transmission of signals by the ego radar source 410 towards these interferers 420*a-c*). For instance, the ego radar source 410 may alter its starting or stopping frequency, chirps, spectrum, etc., of radar signals to at least reduce or eliminate the interference.

Figure 5:
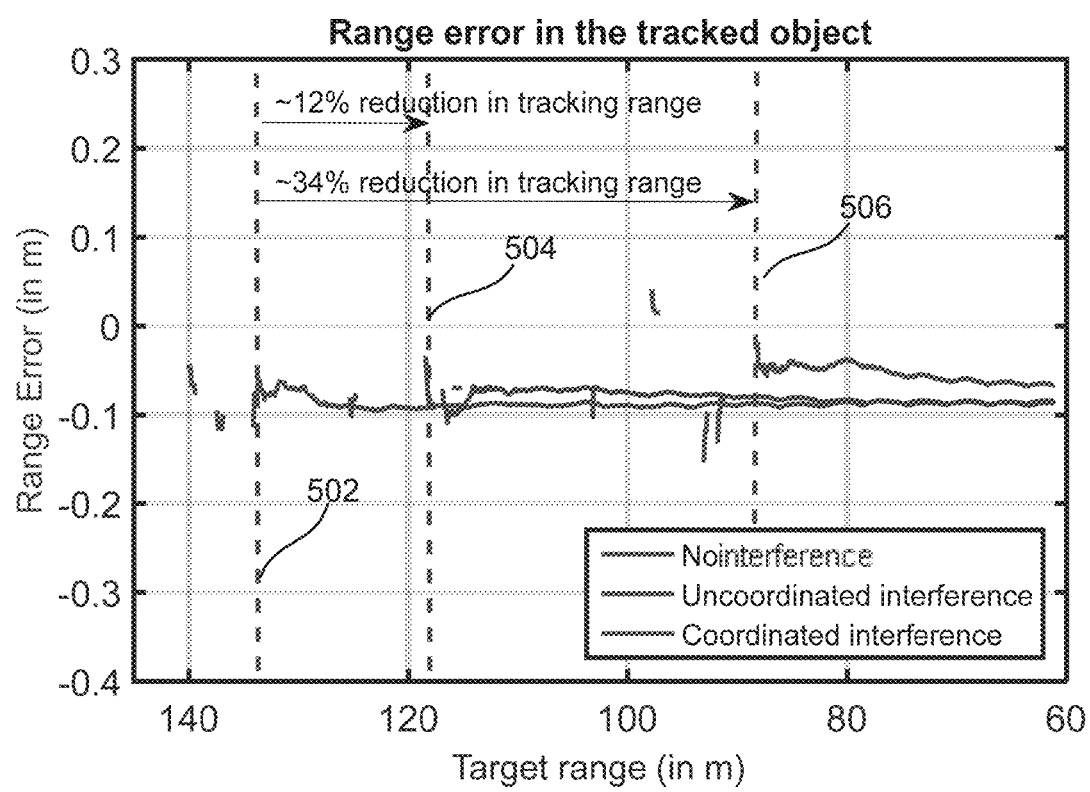
FIG. 5 shows an example graph illustrating the effects of coordination of radar parameters of an ego radar source and interfering radar sources, according to some aspects of the disclosure.

FIG. 5 shows an example graph illustrating the effects of coordination of radar parameters of an ego radar source and interfering radar sources, according to some aspects of the disclosure. In some aspects, the results of a simulation of the tracking of an object by an ego radar source in the presence of multiple interferers illustrate that, with respect to the case where there is no interference to the target tracking from the interferers, uncoordinated interference from the multiple interferers may reduce the radar tracking range by about 34%. In some aspects, the term "radar tracking range" may refer to the distance from the ego radar source to the target within which the ego radar source is capable of tracking the target at least substantially accurately. In some aspects, the term "uncoordinated interference" refers to interference where there is little or no communication between the ego radar source and the interferes to alter the latter's radar parameters to at least reduce or eliminate the interference. In some aspects, when there is a coordinated interference (i.e., the ego radar source communicates with the interferers as discussed above to at least reduce or eliminate the interference), the reduction in the radar tracking range compared to the case where there is no interference is about 12%, lower than the about 34% reduction for the uncoordinated interference. In other words, by coordinating with interferers, in some aspects, an ego radar source may be capable of reducing the impact that interference from interferers may have on the tracking of a target by the ego radar source.

Figure 6A:
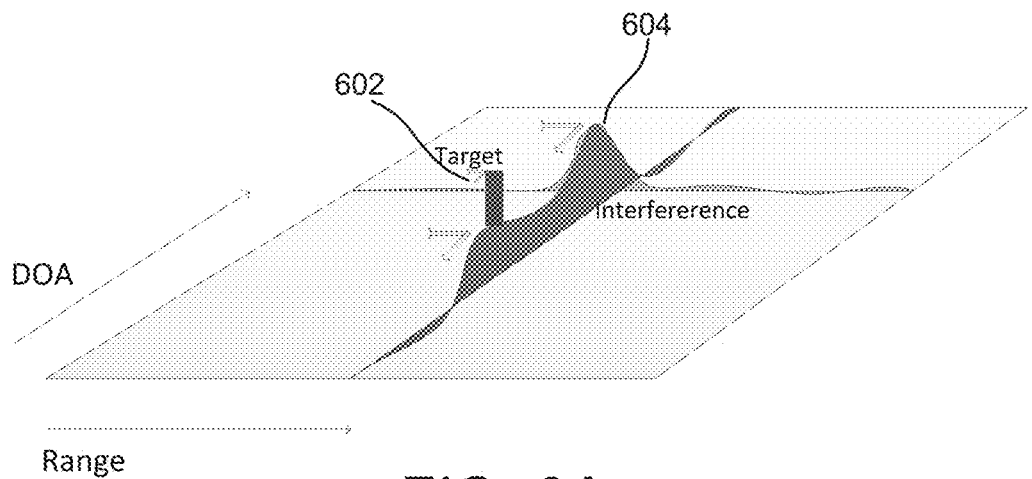
FIGS. 6A-C show example schematic diagrams illustrating prevention of target detection interference due to predictive coordination of radar parameters of an ego radar source and interfering radar sources, according to some aspects of the disclosure.
Figure 6B:
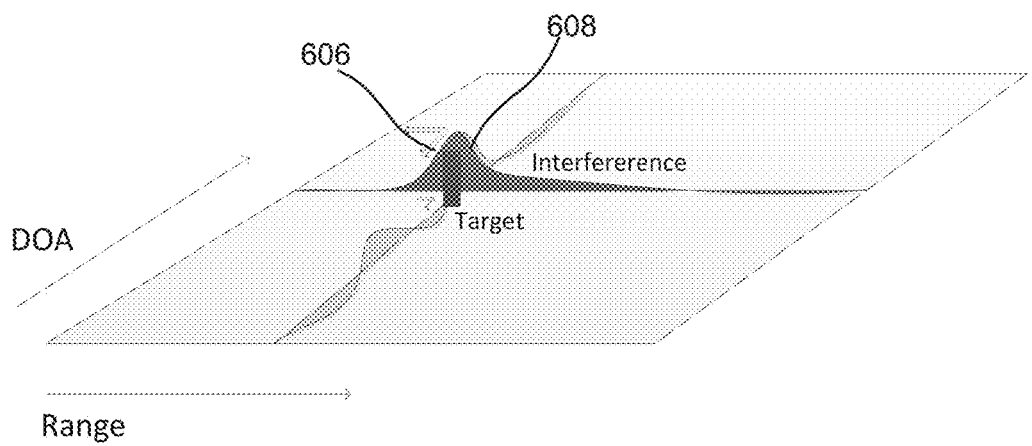
Figure 6C:
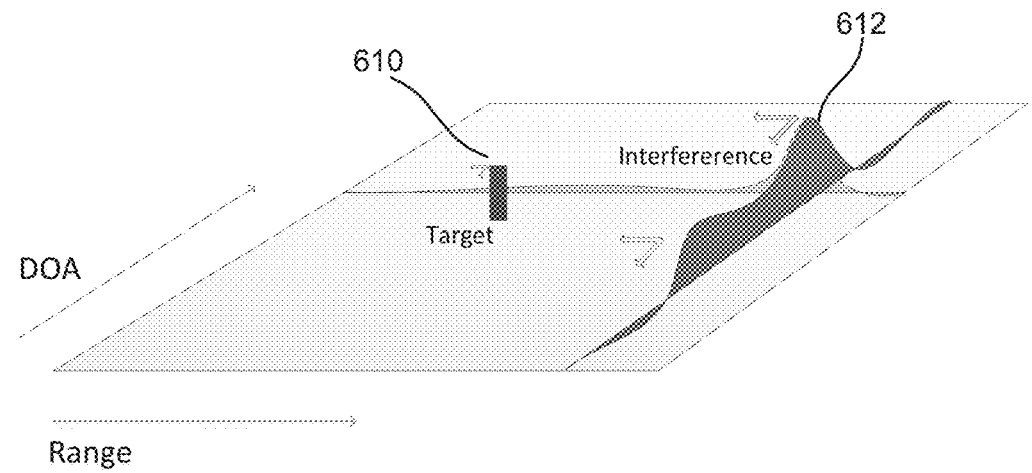

FIGS. 6A-C show example schematic diagrams illustrating prevention of target detection interference due to predictive coordination of radar parameters of an ego radar source and interfering radar sources, according to some aspects of the disclosure. In some aspects, as discussed above, an ego radar source may use radar signals such as FMCW signals to track targets, for instance, by determining the ranges, and the azimuth and elevation angles, of the targets. In some cases, the ego radar source may determine the azimuth and elevation angles based on the DOA of reflected signals. As such, the DOA and the range can be used as measures or descriptions of localization or positions in the vicinity of the ego radar source. For example, a two-dimensional plot of DOA and range can be used to model or map the locations or positions of targets in the vicinity of the ego radar source. Further, the plot can also be used to show the locations or positions of the interference (e.g., with the tracking of the targets by the ego radar source) that may be caused by interferers in the vicinity of the ego radar source and/or the targets. FIGS. 6A-C depict example DOA-vs-range plots showing the relative positions of a target and interference (e.g., amplitudes of interference measured in some arbitrary unit) caused by one or more interferers interfering with the tracking of the target by an ego radar source. For example, FIGS. 6A-C can be schematic illustrations of the relative positions of the target and interference due to the interferers of FIG. 1 or FIG. 4A.

In some aspects, with reference to FIG. 6A, a target 602 may be in a location or position that may be experiencing little or no interference from the interferers in the vicinity of the target 602 or the ego radar source tracking the target. As shown in the figure, the interference 604 may extend over a range of DOA (e.g., over a range of azimuthal angles) but it may be at a distance that is different from the range of the target from the ego radar source. Therefore, the interference 604 may have little or no effect on the detecting or tracking of the target 602 by the ego radar source. In some aspects, the location or position of the interference 604 in the DOA-range plane (e.g., relative to the location or position of the target 602) may depend on, among other things, the radar parameters of the ego-radar signals and the signals from the interferers.

In some aspects, the location or position of the interference 604 in the DOA-range plane may also depend on the trajectories of the target, the ego radar source and/or the interferers. For example, the trajectories of the target, the ego radar source and/or the interferers may be such that the relative locations or positions in the DOA-range plane of a target and an interference may change over time. For example, FIG. 6B shows the relative location or position in the DOA-range plane of the target 606 and the interference 608 at a later time than that represented by FIG. 6A. In FIG. 6A, as noted above, there may be little or no overlap between the target 602 and the interference 604. However, the trajectories of the target, the ego radar source and/or the interferers at the time of FIG. 6A may be such that, as shown in FIG. 6B, the relative location or position in the DOA-range plane of the target 606 and the interference 608 at a later time may overlap, indicating that the interferers may be interfering with the detecting and/or tracking of the target by the ego radar source.

In some aspects, the ego radar source may be configured to predict the evolution of the relative locations or positions of a target and/or an interference in a DOA-range plane as a function of the trajectories of the target, interferers and/or the ego radar source. For example, the ego radar source may determine the trajectory of a target via target tracking. Further, the ego radar source may be configured to determine the trajectories of interferers by communicating with the interferers. For example, the ego radar source may request and obtain from the interferers their velocity (e.g., speed and direction of motion) to determine the trajectories of the interferers. In some cases, the ego radar source may track the interferers to determine the trajectories thereof. In some aspects, upon obtaining the trajectories of the target and/or the interferers, the ego radar source may predict the evolution of the location or position in a DOA-range plane of the target and the interference from the interferers at a later time than when the ego radar source obtained the trajectory information. As an example illustration, the ego radar source may obtain the trajectories of the target 602 and the interferers at the moment of FIG. 6A, and predict the relative location or position of the target 604 and the interference 606 in FIG. 6B based on the obtained trajectories (i.e., predict the overlap of the target and the interference in FIG. 6B, indicating that the interferers would be interfering with the detecting and/or tracking of the target 606 by the ego radar source).

In some aspects, after predicting, based on the obtained trajectories, the evolution of the relative location or position of the target and the interference caused by interferers in the vicinity of the target and/or the ego radar source, the ego radar source may be configured to coordinate with the interferers to at least reduce or eliminate the interference of the interferers with the target detection and/or tracking by the ego radar source. With respect to FIG. 6B, for instance, the ego radar source may coordinate with the interferers so that the overlap of the target 606 and the interference 608 in FIG. 6B may be avoided, and instead the target 610 and the interference 612 avoid overlapping in the DOA-range plane, as shown in FIG. 6C, indicating that the interference 612 from the interferers may not affect the target 610 detection and tracking by the ego radar source. For example, the ego radar source may determine changes or adjustments (e.g., radar parameter changes, trajectory changes, etc.) that the interferes can undertake to avoid interfering with the target detection and/or trcking by the ego radar source, and may communicate the determinations to the interferers, for instance, via a sidelink communication channel.

As a non-limiting example illustration, the ego radar source may determine that a time offset for transmitting radar signals by the ego radar source and/or interferers may result in the target 610 and the interference 612 avoiding overlapping with each other, as shown in FIG. 6C. In some aspects, such predictive coordination between the ego radar source and the interferers—i.e., the ego radar source determining radar parameter adjustments and/or trajectory adjustments for the interferers to make to avoid interfering with target tracking and/or detection, and communicating such adjustments to the interferers—may result in the interference 612 having little or no effect on the detection and/or tracking of the target 610 by the ego radar source. In some aspects, the radar parameter changes that the ego radar source may request the interferers undertake may include changes in one or more of waveform types, frequency (e.g., starting and/or stopping frequencies), bandwidth, spectrum, slope or ramp of the frequency, time of transmission, chirps, etc., of the radar signals emitted by the interferers.

In some aspects, in addition to or instead of one or more interferers adjusting their respective radar signal parameters or trajectories, the ego radar source may adjust its own radar signal parameters or trajectory to avoid interferers from interfering with the detection and/or tracking of targets. For example, the ego radar source may time shift the transmission of the radar signals to at least reduce or avoid the overlap of the target 610 and the interference 612 in a DOA-range plane as shown in FIG. 6C (in contrast to FIG. 6B, for example). As another example, the ego radar source may switch the frequency of the radar signals to accomplish the same goal.

Figure 7:
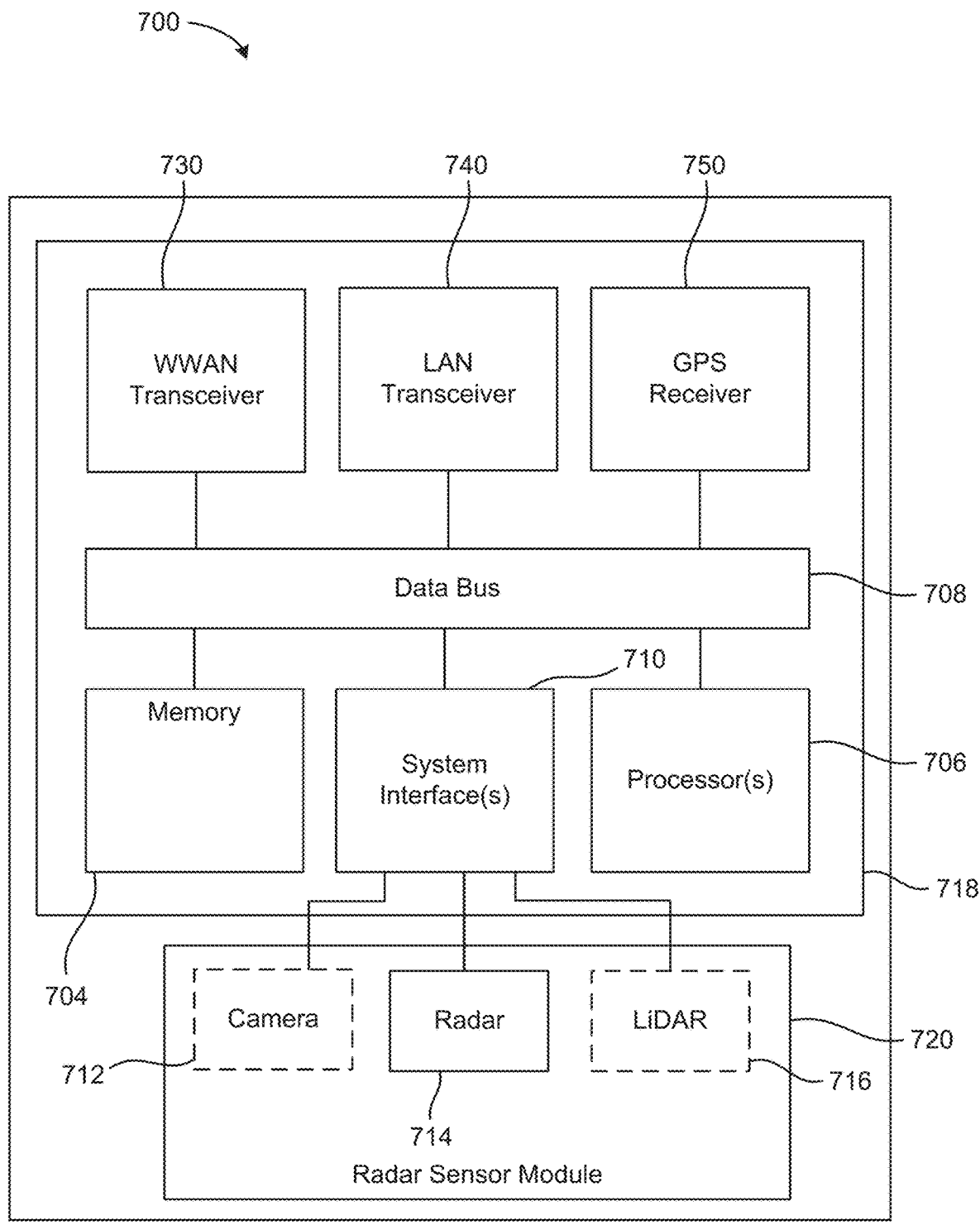
FIG. 7 shows an example illustration of an on-board computer architecture of a radar source, according to some aspects of the disclosure.

FIG. 7 illustrates an on-board computer (OBC) of a radar source such as ego radar source 110 or interferer 120, according to some aspects of the disclosure. In an aspect, the OBC 700 includes a non-transitory computer-readable storage medium, i.e., memory 704, and one or more processors 706 in communication with the memory 704 via a data bus 708. The memory 704 includes one or more storage modules storing computer-readable instructions executable by the processor(s) 706 to perform the functions of the OBC 700 described herein. For example, the processor(s) 706 in conjunction with the memory 704 may implement the various operations described herein.

In some aspects, one or more radar sensor modules 720 are coupled to the OBC 700 (only one is shown in FIG. 7 for simplicity). In some aspects, the radar sensor module 720 includes an optional camera 712, at least one radar 714, and an optional light detection and ranging (LiDAR) sensor 716. The OBC 700 also includes one or more system interfaces 710 connecting the processor(s) 706, by way of the data bus 708, to the radar sensor module 720 and, optionally, other vehicle sub-systems (not shown).

The OBC 700 also includes, at least in some cases, a wireless wide area network (WWAN) transceiver 730 configured to communicate via one or more wireless communication networks (not shown), such as an NR network, an LTE network, a Global System for Mobile communication (GSM) network, and/or the like. The WWAN transceiver 430 may be connected to one or more antennas (not shown) for communicating with other network nodes, such as other vehicle, pedestrian devices, infrastructure access points, roadside units (RSUs), base stations (e.g., eNBs, gNBs), etc., via at least one designated RAT (e.g., NR, LTE, GSM, etc.) over a wireless communication medium of interest (e.g., some set of time/frequency resources in a particular frequency spectrum). The WWAN transceiver 730 may be variously configured for transmitting and encoding signals (e.g., messages, indications, information, and so on), and, conversely, for receiving and decoding signals (e.g., messages, indications, information, pilots, and so on) in accordance with the designated RAT.

The OBC 700 also includes, at least in some cases, a wireless local area network (WLAN) transceiver 740. The WLAN transceiver 740 may be connected to one or more antennas (not shown) for communicating with other network nodes, such as other radar source (e.g., radar systems of other vehicles), pedestrian UEs, infrastructure access points, RSUs, etc., via at least one designated RAT (e.g., cellular vehicle-to-everything (C-V2X), IEEE 802.11p (also known as wireless access for vehicular environments (WAVE)), dedicated short-range communication (DSRC), etc.) over a wireless communication medium of interest. The WLAN transceiver 740 may be variously configured for transmitting and encoding signals (e.g., messages, indications, information, and so on), and, conversely, for receiving and decoding signals (e.g., messages, indications, information, pilots, and so on) in accordance with the designated RAT.

As used herein, a "transceiver" may include a transmitter circuit, a receiver circuit, or a combination thereof, but need not provide both transmit and receive functionalities in all designs. For example, a low functionality receiver circuit may be employed in some designs to reduce costs when providing full communication is not necessary (e.g., a receiver chip or similar circuitry simply providing low-level sniffing).

The OBC 700 also includes, at least in some cases, a global positioning systems (GPS) receiver 750. The GPS receiver 750 may be connected to one or more antennas (not shown) for receiving satellite signals. The GPS receiver 750 may comprise any suitable hardware and/or software for receiving and processing GPS signals. The GPS receiver 450 requests information and operations as appropriate from the other systems, and performs the calculations necessary to determine a radar source's position using measurements obtained by any suitable GPS algorithm.

Figure 8:
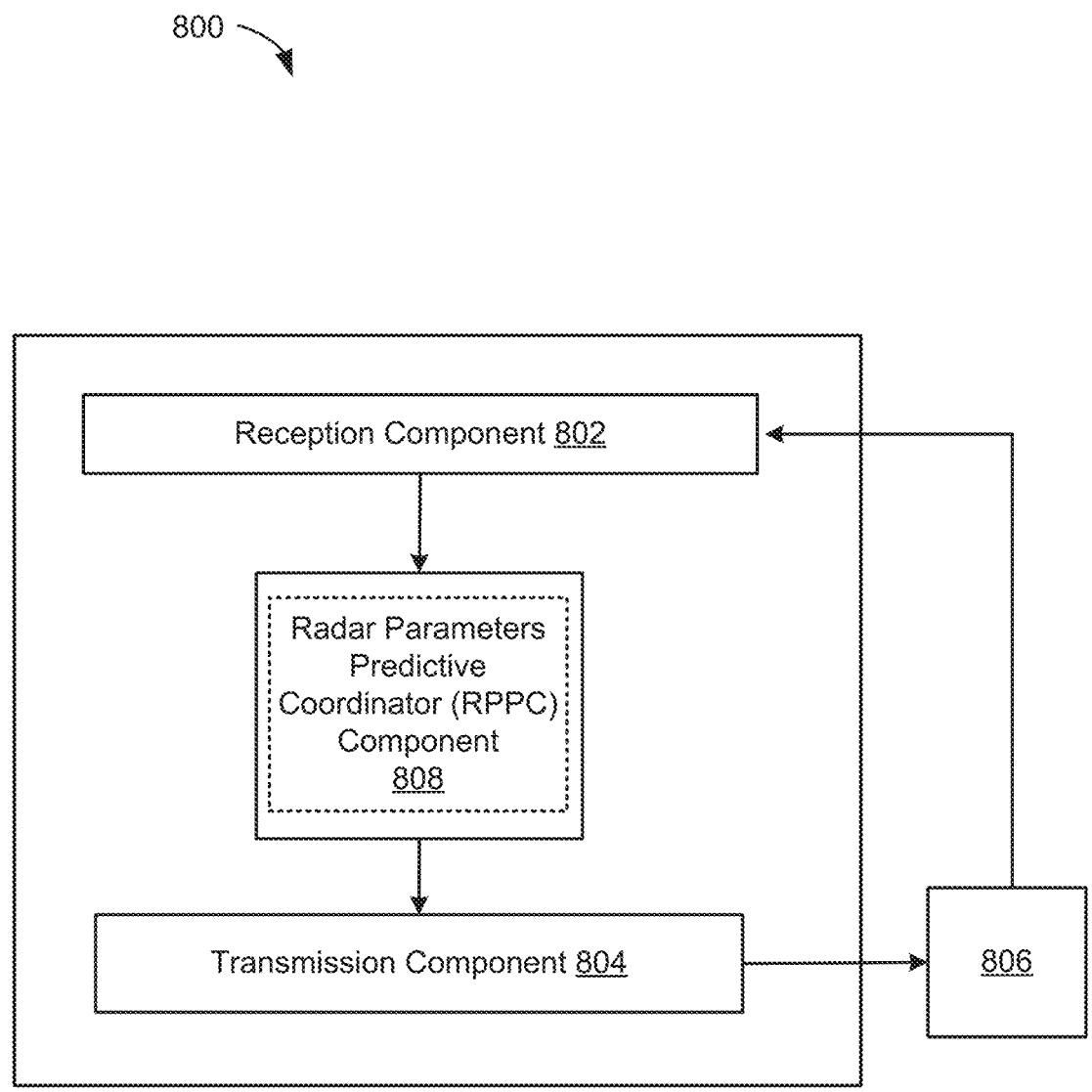
FIG. 8 shows an example block diagram illustrating components of a radar source, according to various aspects of the disclosure.

FIG. 8 shows an example block diagram illustrating components of a radar source, according to various aspects of the disclosure. The apparatus 800 may be a radar source such as 110, 120, 410, 420a-c, 430, or a radar source may include the apparatus 800. In some aspects, the apparatus 800 includes a reception component 802 and a transmission component 804, which may be in communication with one another (for example, via one or more buses and/or one or more other components). As shown, the apparatus 800 (e.g., an ego radar source) may communicate with another apparatus 806 (e.g., an interfering radio source) using the reception component 802 and the transmission component 804. As further shown, the apparatus 800 may include one or more of a radio parameters predictive coordinator (RPPC) component or module 808, among other examples.

Figure 9:
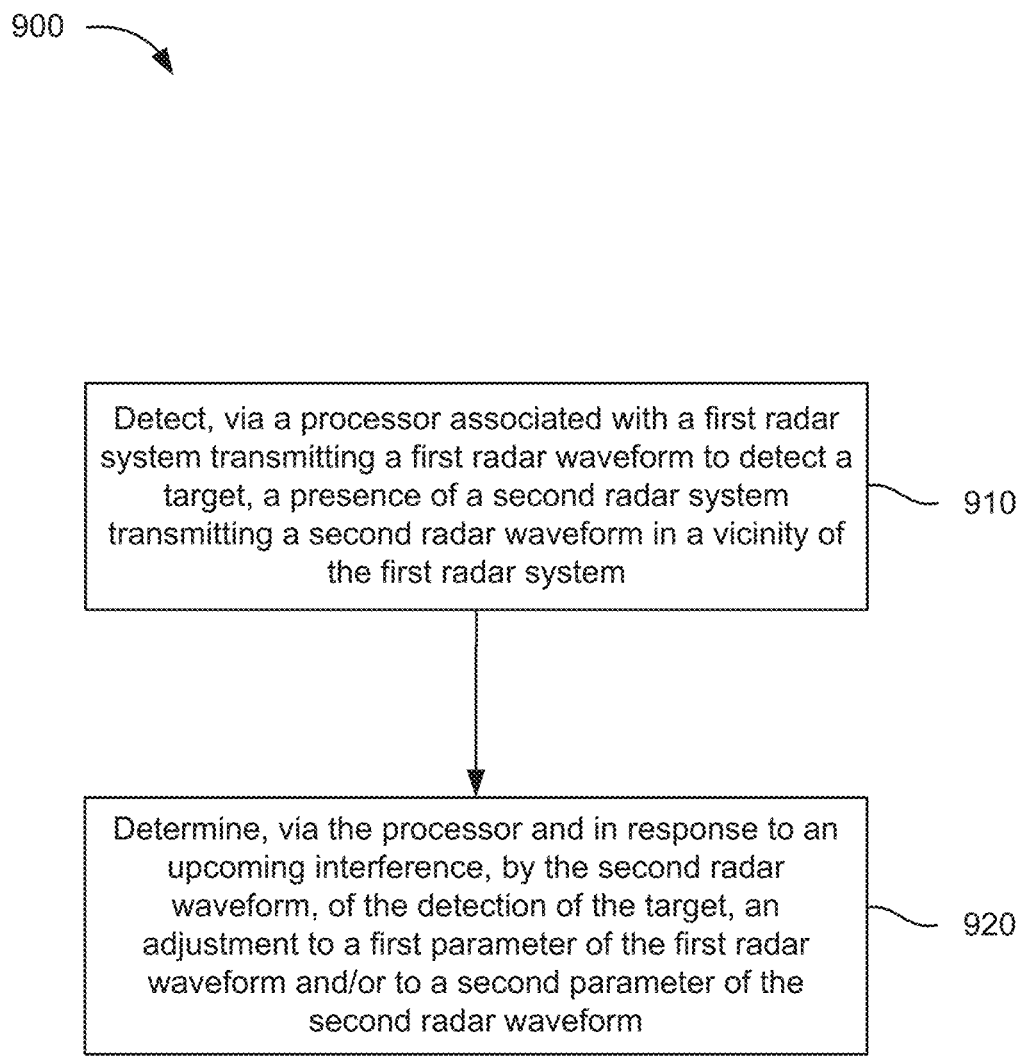
FIG. 9 shows an example flow diagram of a method of predictive coordination of radar parameters of an ego radar source and interfering radar sources, according to various aspects of the disclosure.

In some aspects, the apparatus 800 may be configured to perform one or more operations described herein in connection with FIG. 9. In some aspects, the apparatus 800 and/or one or more components shown in FIG. 8 may include one or more components of the radar source described above in connection with FIG. 7. Additionally, or alternatively, one or more components shown in FIG. 8 may be implemented within one or more components described above in connection with FIG. 7. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 802 may receive communications, such as reference signals, control information, data communications, or a combination thereof, from the apparatus 806. The reception component 802 may provide received communications to one or more other components of the apparatus 800. In some aspects, the reception component 802 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 806. In some aspects, the reception component 802 may receive a radar signal. In some aspects, the reception component 802 may include one or more antennas, a demodulator, a MIMO detector, a receive processor, a controller/processor, a memory, or a combination thereof, of a radar source (e.g., an ego or interfering radar source).

The transmission component 804 may transmit communications, such as reference signals, control information, data communications, or a combination thereof, to the apparatus 806. In some aspects, one or more other components of the apparatus 806 may generate communications and may provide the generated communications to the transmission component 804 for transmission to the apparatus 806. In some aspects, the transmission component 804 may perform signal processing on the generated communications (such as filtering, amplification, modulation, digital-to-analog conversion, multiplexing, interleaving, mapping, or encoding, among other examples), and may transmit the processed signals to the apparatus 806. In some aspects, the transmission component 804 may transmit a radar signal. In some aspects, the transmission component 804 may include one or more antennas, a modulator, a transmit MIMO processor, a transmit processor, a controller/processor, a memory, or a combination thereof, of the radar source (e.g., an ego or interfering radar source). In some aspects, the transmission component 804 may be collocated with the reception component 802 in a transceiver.

The radar parameters predictive coordinator (RPPC) component 808 may be implemented via hardware, software, or combinations thereof. For example, the RPPC component 808 may be implemented as a processor (e.g., processor 706), circuit, and/or instructions 806 stored in a memory (e.g., memory 704) and executed by a processor. In some examples, the RPPC component 808 can be integrated within a modem subsystem of the apparatus 800. For example, the RPPC component 808 can be implemented by a combination of software components (e.g., executed by a DSP or a general processor) and hardware components (e.g., logic gates and circuitry) within the modem subsystem. The RPPC component 808 may be used for various aspects of the present disclosure, for example, aspects of FIGS. 1-7 and 9. The RPPC component 808 can be configured to detect, via a processor associated with a first radar system transmitting a first radar waveform to detect a target, a presence of a second radar system transmitting a second radar waveform in a vicinity of the first radar system. Further, the RPPC component 808 may determine, via the processor and in response to an upcoming interference by the second radar waveform of the detection of the target by the first radar system, an adjustment to a first parameter of the first radar waveform and/or to a second parameter of the second radar waveform.

In some aspects, the quantity and arrangement of components shown in FIG. 8 are provided as an example. In practice, there may be additional components, fewer components, different components, or differently arranged components than those shown in FIG. 8. Furthermore, two or more components shown in FIG. 8 may be implemented within a single component, or a single component shown in FIG. 8 may be implemented as multiple, distributed components. Additionally, or alternatively, a set of (one or more) components shown in FIG. 8 may perform one or more functions described as being performed by another set of components shown in FIG. 8.

FIG. 9 shows an example flow diagram of a method of predictive coordination of radar parameters of an ego radar source and interfering radar sources, according to various aspects of the disclosure. The method 900 may be performed by an ego radar source, such as ego radar source 410, or radar source 105 or radar source 110. For example, an ego radar source, such as 410 may utilize one or more components, such as the reception component 802, the radar processing component 808, the determination component 810, the prediction component 812, and the transmission component 804, to execute the steps of method 900. As illustrated, the method 900 includes a number of enumerated steps, but aspects of the method 900 may include additional steps before, after, and in between the enumerated steps. In some aspects, one or more of the enumerated steps may be omitted or performed in a different order.

At block 910, a processor associated with a first radar system transmitting a first radar waveform to detect a target may detect a presence of a second radar system transmitting a second radar waveform in a vicinity of the first radar system.

At block 920, the processor may determine, in response to an upcoming interference by the second radar waveform of the detection of the target by the first radar system, an adjustment to a first parameter of the first radar waveform and/or to a second parameter of the second radar waveform.

Some aspects of method 900 further comprise transmitting, via the first radar system and to the second radar system, a communication including the determined adjustment to the second parameter of the second radar waveform. In some aspects, the communication is configured to cause the second radar system to adjust the second parameter based on the determined adjustment to the second parameter of the second radar waveform to at least substantially prevent the predicted upcoming interference. In some aspects, the first radar system communicates the determined adjustment to the second radar system via a side-communication channel connecting the first radar system to the second radar system. In some aspects, the first radar system is a radar system of a vehicle, and the side-communication channel is a vehicle-to-everything (V2X) communication channel.

Some aspects of method 900 further comprise performing a first target detection using a third radar waveform and performing a second target detection using a fourth radar waveform. In some aspects, the presence of the second radar system is detected based on a comparison of a first result of the first target detection and a second result of the second target detection. In some aspects, the comparison includes a difference between number of targets detected during the first target detection and during the second target detection. In some aspects, the comparison includes a difference between locations of targets detected during the first target detection and during the second target detection. In some aspects, the comparison includes a difference between noise levels detected during the first target detection and during the second target detection.

Some aspects of method 900 further comprise detecting a trajectory of the second radar system. In some aspects, the upcoming interference is predicted based on the detected trajectory of the second radar system. In some aspects, the upcoming interference is predicted based on the detected trajectory of the second radar system. In some aspects, the trajectory of the second radar system is detected based on a reflection, received at the first radar system, of the first radar waveform reflected from a vehicle including the second radar system. In some aspects, the trajectory of the second radar system is detected based on the second radar waveform and/or a reflection of the second radar waveform, received at the first radar system.

In some aspects, the upcoming interference is predicted based on a trajectory of the first radar system and/or the target.

Some aspects of method 900 further comprise adjusting, by the first radar system, the first parameter based on the determined adjustment to the first parameter of the first radar waveform to at least substantially prevent the predicted upcoming interference.

In some aspects, the first parameter of the first radar waveform and/or the second parameter of the second radar waveform include a waveform type of the first radar waveform and/or the second radar waveform, respectively. In some aspects, the first parameter of the first radar waveform and/or the second parameter of the second radar waveform include one or both of the starting frequency and the stopping frequency of the first radar waveform and/or the second radar waveform, respectively. In some aspects, the first parameter of the first radar waveform and/or the second parameter of the second radar waveform include one or both of the bandwidth and the spectrum of the first radar waveform and/or the second radar waveform, respectively.

Recitations of Some Aspects of the Present Disclosure

Aspect 1: A method, comprising: detecting, via a processor associated with a first radar system transmitting a first radar waveform to detect a target, a presence of a second radar system transmitting a second radar waveform in a vicinity of the first radar system; and determining, via the processor and in response to an upcoming interference by the second radar waveform of the detection of the target by the first radar system, an adjustment to a first parameter of the first radar waveform and/or to a second parameter of the second radar waveform.

Aspect 2: The method of aspect 1, further comprising: transmitting, via the first radar system and to the second radar system, a communication including the determined adjustment to the second parameter of the second radar waveform, the communication configured to cause the second radar system to adjust the second parameter based on the determined adjustment to the second parameter of the second radar waveform to at least substantially prevent the predicted upcoming interference.

Aspect 3: The method of aspect 2, wherein the first radar system transmits the determined adjustment to the second radar system via a side-communication channel connecting the first radar system to the second radar system.

Aspect 4: The method of aspect 3, wherein the first radar system is a radar system of a vehicle, and the side-communication channel is a vehicle-to-everything (V2X) communication channel.

Aspect 5: The method of any of aspect 1-4, further comprising: performing a first target detection using a third radar waveform; and performing a second target detection using a fourth radar waveform, wherein: the presence of the second radar system is detected based on a comparison of a first result of the first target detection and a second result of the second target detection.

Aspect 6: The method of aspect 5, wherein the comparison includes a difference between number of targets detected during the first target detection and during the second target detection.

Aspect 7: The method of aspect 5 or 6, wherein the comparison includes a difference between locations of targets detected during the first target detection and during the second target detection.

Aspect 8: The method of any of aspects 5-7, wherein the comparison includes a difference between noise levels detected during the first target detection and during the second target detection.

Aspect 9: The method of any of aspects 1-8, further comprising detecting a trajectory of the second radar system.

Aspect 10: The method of aspect 9, wherein the upcoming interference is predicted based on the detected trajectory of the second radar system.

Aspect 11: The method of aspect 9 or 10, wherein the trajectory of the second radar system is detected based on a reflection, received at the first radar system, of the first radar waveform reflected from a vehicle including the second radar system.

Aspect 12: The method of any of aspects 9-11, wherein the trajectory of the second radar system is detected based on the second radar waveform and/or a reflection of the second radar waveform, received at the first radar system.

Aspect 13: The method of any of aspects 1-12, wherein the upcoming interference is predicted based on a trajectory of the first radar system and/or the target.

Aspect 14: The method of any of aspects 1-13, further comprising: adjusting, by the first radar system, the first parameter based on the determined adjustment to the first parameter of the first radar waveform to at least substantially prevent the predicted upcoming interference.

Aspect 15: The method of any of aspects 1-14, wherein the first parameter of the first radar waveform and/or the second parameter of the second radar waveform include a waveform type of the first radar waveform and/or the second radar waveform, respectively.

Aspect 16: The method of any of aspects 1-15, wherein the first parameter of the first radar waveform and/or the second parameter of the second radar waveform include one or both of the starting frequency and the stopping frequency of the first radar waveform and/or the second radar waveform, respectively.

Aspect 17: The method of any of aspects 1-16, wherein the first parameter of the first radar waveform and/or the second parameter of the second radar waveform include one or both of the bandwidth and the spectrum of the first radar waveform and/or the second radar waveform, respectively.

Aspect 18: An apparatus, comprising: a memory; a processor coupled to the memory; and a transceiver coupled to the processor, the apparatus configured to perform the methods of aspects 1-17.

Aspect 19: A non-transitory computer-readable medium (CRM) having program code recorded thereon, the program code comprises code for causing an apparatus to perform the methods of aspects 1-17.

Aspect 20: An apparatus comprising means for performing the methods of aspects 1-17.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A first apparatus, comprising:
a memory;
a transceiver; and
a processor coupled with the memory and configured to, when executing instructions stored on the memory, to cause the first apparatus to:
detect a presence of a second radar system of a second apparatus transmitting a second radar waveform in a vicinity of a first radar system of a first apparatus that is transmitting a first radar waveform to detect a target;
predict an upcoming interference by the second radar waveform of the detection of the target by the first radar system occurring at a later time than that of the detection of the presence of the second radar system transmitting the second radar waveform; and
determine, in response to the predicted upcoming interference, an adjustment to a first parameter of the first radar waveform and/or to a second parameter of the second radar waveform.

2. The first apparatus of claim 1, wherein the transceiver is configured to:
transmit, to the second apparatus, a communication including the determined adjustment to the second parameter of the second radar waveform,
the communication configured to cause the second apparatus to adjust the second parameter based on the determined adjustment to the second parameter of the second radar waveform to at least substantially prevent the predicted upcoming interference.

3. The first apparatus of claim 1, wherein the transceiver is configured to transmit the determined adjustment to the second apparatus via a side-communication channel connecting the first apparatus to the second apparatus.

4. The first apparatus of claim 3, wherein the first apparatus is a vehicle, and the side-communication channel is a vehicle-to-everything (V2X) communication channel.

5. The first apparatus of claim 1, wherein the processor is further configured to cause the first apparatus to:
perform a first target detection using a third radar waveform; and
perform a second target detection using a fourth radar waveform,
the presence of the second radar system detected based on a comparison of a first result of the first target detection and a second result of the second target detection.

6. The first apparatus of claim 5, wherein the comparison includes (1) a difference between number of targets detected during the first target detection and during the second target detection; (2) a difference between locations of targets detected during the first target detection and during the second target detection; or (3) a difference between noise levels detected during the first target detection and during the second target detection.

7. The first apparatus of claim 1, wherein the upcoming interference is predicted based on a trajectory of the first apparatus, a trajectory of the second apparatus, and/or a trajectory of the target.

8. The first apparatus of claim 7, wherein the processor is further configured cause the first apparatus to detect the trajectory of the second apparatus is detected based on: (1) a reflection, received at the first radar system, of the first radar waveform reflected from the second apparatus; or (2) the second radar waveform and/or a reflection of the second radar waveform, received at the first radar system.

9. The first apparatus of claim 1, wherein the processor is further configured to cause the first apparatus to:
adjust the first parameter based on the determined adjustment to the first parameter of the first radar waveform to at least substantially prevent the predicted upcoming interference.

10. The first apparatus of claim 1, wherein the first parameter of the first radar waveform and/or the second parameter of the second radar waveform include: (1) a waveform type of the first radar waveform and/or the second radar waveform, respectively; (2) one or both of the starting frequency and the stopping frequency of the first radar waveform and/or the second radar waveform, respectively; or (3) one or both of the bandwidth and the spectrum of the first radar waveform and/or the second radar waveform, respectively.

11. A non-transitory computer-readable medium (CRM) having program code recorded thereon, the program code comprising:
code for causing a first apparatus including a first radar system transmitting a first radar waveform to detect a target, to detect a presence of a second apparatus including a second radar system transmitting a second radar waveform in a vicinity of the first radar system;
code for causing the first apparatus to predict an upcoming interference by the second radar waveform of the detection of the target by the first radar system occurring at a later time than that of the detection of the presence of the second radar system transmitting the second radar waveform; and
code for causing the first apparatus to determine, in response to the predicted upcoming interference, an adjustment to a first parameter of the first radar waveform and/or to a second parameter of the second radar waveform.

12. The non-transitory CRM of claim 11, wherein the program code further comprises a code for causing a transceiver associated with the first apparatus to:
transmit, to the second apparatus, a communication including the determined adjustment to the second parameter of the second radar waveform,
the communication configured to cause the second apparatus to adjust the second parameter based on the determined adjustment to the second parameter of the second radar waveform to at least substantially prevent the predicted upcoming interference.

13. The non-transitory CRM of claim 11, wherein the program code further comprises a code for causing a transceiver associated with the first apparatus to transmit the determined adjustment to the second apparatus via a side-communication channel connecting the first apparatus to the second apparatus.

14. The non-transitory CRM of claim 13, wherein the first apparatus is a vehicle, and the side-communication channel is a vehicle-to-everything (V2X) communication channel.

15. The non-transitory CRM of claim 11, wherein the program code further comprises a code for causing the first apparatus to:
perform a first target detection using a third radar waveform; and
perform a second target detection using a fourth radar waveform,
the presence of the second radar system detected based on a comparison of a first result of the first target detection and a second result of the second target detection.

16. The non-transitory CRM of claim 15, wherein the comparison includes (1) a difference between number of targets detected during the first target detection and during the second target detection; (2) a difference between locations of targets detected during the first target detection and during the second target detection; or (3) a difference between noise levels detected during the first target detection and during the second target detection.

17. The non-transitory CRM of claim 11, wherein the upcoming interference is predicted based on a trajectory of the apparatus, a trajectory of the second apparatus, and/or a trajectory of the target.

18. The non-transitory CRM of claim 17, wherein the program code further comprises a code for causing the first apparatus to detect the trajectory of the second apparatus based on: (1) a reflection, received at the first radar system, of the first radar waveform reflected from the second apparatus; or (2) the second radar waveform and/or a reflection of the second radar waveform, received at the first radar system.

19. The non-transitory CRM of claim 11, wherein the program code further comprises a code for causing the first apparatus to:
adjust the first parameter based on the determined adjustment to the first parameter of the first radar waveform to at least substantially prevent the predicted upcoming interference.

20. The non-transitory CRM of claim 11, wherein the first parameter of the first radar waveform and/or the second parameter of the second radar waveform include: (1) a waveform type of the first radar waveform and/or the second radar waveform, respectively; (2) one or both of the starting frequency and the stopping frequency of the first radar waveform and/or the second radar waveform, respectively; or (3) one or both of the bandwidth and the spectrum of the first radar waveform and/or the second radar waveform, respectively.

21. A first apparatus, comprising:
means for detecting a presence of a second radar system of a second apparatus transmitting a second radar waveform in a vicinity of a first radar system of the first apparatus that is transmitting a first radar waveform to detect a target;
means for predicting an upcoming interference by the second radar waveform of the detection of the target by the first radar system occurring at a later time than that of the detection of the presence of the second radar system transmitting the second radar waveform; and
means for determining, in response to the predicted upcoming interference, an adjustment to a first parameter of the first radar waveform and/or to a second parameter of the second radar waveform.

22. The first apparatus of claim 21, further comprising:
means for transmitting, to the second apparatus, a communication including the determined adjustment to the second parameter of the second radar waveform, the communication configured to cause the second apparatus to adjust the second parameter based on the determined adjustment to the second parameter of the second radar waveform to at least substantially prevent the predicted upcoming interference.

23. The first apparatus of claim 21, further comprising means for transmitting the determined adjustment to the second apparatus via a side-communication channel connecting the first apparatus to the second apparatus.

24. The first apparatus of claim 21, further comprising:
   means for performing a first target detection using a third radar waveform; and
   means for performing a second target detection using a fourth radar waveform,
      the presence of the second radar system detected based on a comparison of a first result of the first target detection and a second result of the second target detection.

25. The first apparatus of claim 21, wherein the upcoming interference is predicted based on a trajectory of the first apparatus, a trajectory of the second apparatus, and/or a trajectory of the target.

26. The first apparatus of claim 21, further comprising:
   means for adjusting the first parameter based on the determined adjustment to the first parameter of the first radar waveform to at least substantially prevent the predicted upcoming interference.

27. The first apparatus of claim 1, wherein the processor is further configured to cause the first apparatus to:
   determine a first direction-of-arrival (DOA) and a first range of the target and a second DOA and a second range of an interference by the second radar waveform, wherein:
      the upcoming interference includes a first overlap of the first DOA of the target and the second DOA of the interference and a second overlap of the first range of the target and the second range of the interference at the later time.

28. The first apparatus of claim 27, wherein the adjustment to the first parameter of the first radar waveform and/or to the second parameter of the second radar waveform are configured to reduce or avoid the first overlap or the second overlap at the later time.

29. The non-transitory CRM of claim 11, wherein the program code further comprises a code for causing the first apparatus to:
   determine a first direction-of-arrival (DOA) and a first range of the target and a second DOA and a second range of an interference by the second radar waveform, wherein:
      the upcoming interference includes a first overlap of the first DOA of the target and the second DOA of the interference and a second overlap of the first range of the target and the second range of the interference at the later time.

30. The first apparatus of claim 21, further comprising:
   means for determining a first direction-of-arrival (DOA) and a first range of the target and a second DOA and a second range of an interference by the second radar waveform, wherein:
      the upcoming interference includes a first overlap of the first DOA of the target and the second DOA of the interference and a second overlap of the first range of the target and the second range of the interference at the later time.

\* \* \* \* \*